(12) United States Patent
Elshaw et al.

(10) Patent No.: US 11,235,879 B2
(45) Date of Patent: Feb. 1, 2022

(54) AIRCRAFT SERVICE TROLLEY AND GALLEY ENCLOSURE THEREFOR

(71) Applicant: B/E Aerospace, Inc., Winston-Salem, NC (US)

(72) Inventors: Neil R. Elshaw, Gosport (GB); Chris Nixon, Hemel Hempstead (GB); Elizabeth M. Payne, Bristol (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 756 days.

(21) Appl. No.: 15/647,193

(22) Filed: Jul. 11, 2017

(65) Prior Publication Data

US 2018/0016013 A1 Jan. 18, 2018

Related U.S. Application Data

(60) Provisional application No. 62/361,460, filed on Jul. 12, 2016.

(51) Int. Cl.
*B64D 11/04* (2006.01)
*E05C 3/00* (2006.01)
(Continued)

(52) U.S. Cl.
CPC .............. *B64D 11/04* (2013.01); *B21D 53/92* (2013.01); *B64D 9/003* (2013.01); *B64D 13/06* (2013.01);
(Continued)

(58) Field of Classification Search
CPC ..... B64D 11/04; E05C 3/004; E05B 17/0025; E05B 2017/0095; E05B 57/00;
(Continued)

(56) References Cited

U.S. PATENT DOCUMENTS 758,268 A 4/1904 Moss
758,939 A 5/1904 Siems
(Continued)

FOREIGN PATENT DOCUMENTS

DE 102008064084 A1 * 7/2010 ............. B64D 11/04
DE 202014007350 U1 10/2014
(Continued)

OTHER PUBLICATIONS

Machine Translation of DE 102008064084 A1, 2020, pp. 1-17 (Year: 2020).*
(Continued)

*Primary Examiner* — Christine M Mills
(74) *Attorney, Agent, or Firm* — Suiter Swantz pc llo

(57) ABSTRACT

A retaining assembly secures an equipment item within an aircraft galley compartment. The retaining assembly may include a turn button assembly including a turn button connected to a front edge of the galley compartment to secure the equipment item within the galley compartment. The turn button rotates between a first position for allowing insertion or release of the equipment item from the galley compartment and a second position for securing the equipment item within the galley compartment. A turn button recess on an inner surface of a panel door that is coupled to an edge of an opening for the galley compartment receives the turn button of the turn button assembly when the turn button is in the second position to allow the panel door to fully close over the opening for the galley compartment.

17 Claims, 11 Drawing Sheets

(51) Int. Cl.
*F16B 5/02* (2006.01)
*F16B 5/00* (2006.01)
*B64D 13/06* (2006.01)
*B64D 9/00* (2006.01)
*B21D 53/92* (2006.01)
*B64F 5/00* (2017.01)

(52) U.S. Cl.
CPC ............... *B64F 5/00* (2013.01); *E05C 3/004* (2013.01); *F16B 5/0088* (2013.01); *F16B 5/0225* (2013.01); *B64D 2013/0629* (2013.01); *F25B 2500/12* (2013.01); *Y10T 403/75* (2015.01)

(58) Field of Classification Search
CPC .... E05B 63/0052; E05B 63/02; E05B 65/006; E05B 65/5253; E05B 15/0006; Y10T 292/03; Y10T 292/086; Y10T 292/1049; Y10T 292/1083; Y10T 292/1084; Y10T 292/1085; Y10T 292/1092; Y10T 292/42; Y10T 292/444; Y10S 292/15; Y10S 292/55
USPC ..... 292/1, 54, 218, 202, 203, 204, 210, 300, 292/304
See application file for complete search history.

(56) References Cited

U.S. PATENT DOCUMENTS

| | | | |
|---|---|---|---|
| 794,523 A | 7/1905 | Litz | |
| 1,214,754 A | 2/1917 | Carscadden | |
| 2,246,787 A | 6/1941 | Dall | |
| 2,974,499 A | 3/1961 | Sinatra et al. | |
| 3,171,401 A | 3/1965 | Mcduffee | |
| 4,056,276 A | 11/1977 | Jarvis | |
| 4,106,587 A | 8/1978 | Nash et al. | |
| 4,418,901 A | 12/1983 | Woods et al. | |
| 4,989,252 A | 1/1991 | Nakanishi et al. | |
| 4,993,247 A | 2/1991 | Minemura | |
| 5,040,857 A | 8/1991 | Mandel et al. | |
| 5,060,920 A | 10/1991 | Engibarov | |
| 5,186,516 A | 2/1993 | Alexander et al. | |
| 5,197,314 A | 3/1993 | Stillwagon et al. | |
| 5,280,973 A | 1/1994 | Culling | |
| 5,320,804 A | 6/1994 | Zakaria et al. | |
| 5,322,244 A | 6/1994 | Dallmann et al. | |
| 5,337,977 A | 8/1994 | Fleming et al. | |
| 5,395,075 A | 3/1995 | Sprenger et al. | |
| 5,397,143 A | 3/1995 | Bird | |
| 5,465,660 A * | 11/1995 | Conti ................... | B30B 9/3003 100/100 |
| 5,474,260 A | 12/1995 | Schwertfeger et al. | |
| 5,490,455 A | 2/1996 | Conti et al. | |
| 5,520,357 A | 5/1996 | Payne et al. | |
| 5,548,982 A | 8/1996 | Rawling | |
| 5,784,836 A | 7/1998 | Ehrick | |
| 5,832,670 A | 11/1998 | Bennett | |
| 5,947,082 A | 9/1999 | Choi et al. | |
| 6,073,883 A | 6/2000 | Ohlmann et al. | |
| 6,116,660 A | 9/2000 | Langkamp, Jr. et al. | |
| 6,126,158 A | 10/2000 | Engibarov | |
| 6,148,631 A | 11/2000 | Watanabe et al. | |
| 6,168,518 B1 | 1/2001 | Messmer et al. | |
| 6,182,926 B1 | 2/2001 | Moore | |
| 6,196,187 B1 | 3/2001 | Zubeck et al. | |
| 6,357,806 B1 * | 3/2002 | Saku ................... | E05B 63/143 292/182 |
| 6,499,775 B2 * | 12/2002 | Fujiwara ............ | E05B 17/0045 292/137 |
| 6,609,590 B2 | 8/2003 | Zelinski | |
| 6,616,098 B2 | 9/2003 | Mills | |
| 6,632,269 B1 | 10/2003 | Najm | |
| 6,659,225 B2 | 12/2003 | Olliges et al. | |
| 6,668,650 B1 | 12/2003 | Lafleur et al. | |
| 6,739,100 B1 | 5/2004 | Lewandowski | |
| 6,827,180 B2 | 12/2004 | Wilson | |
| 6,883,753 B1 | 4/2005 | Scown | |
| 6,928,236 B2 * | 8/2005 | Suzuki ................... | B64D 11/04 392/441 |
| 7,011,542 B2 * | 3/2006 | Suzuki ................... | B64D 11/04 439/374 |
| 7,121,510 B2 | 10/2006 | Ritts | |
| 7,201,254 B2 | 4/2007 | Redmann et al. | |
| 7,231,778 B2 | 6/2007 | Rigney et al. | |
| 7,255,376 B2 | 8/2007 | Pratt et al. | |
| 7,374,131 B2 | 5/2008 | Tiid et al. | |
| 7,510,223 B2 | 3/2009 | Malkowski et al. | |
| 7,631,726 B2 | 12/2009 | McWilliam et al. | |
| 7,694,660 B2 | 4/2010 | Koss | |
| D617,582 S | 6/2010 | Zalewski | |
| 7,780,114 B2 * | 8/2010 | Doebertin ............. | B64D 11/04 244/118.5 |
| 7,942,234 B2 | 5/2011 | Utsunomiya | |
| 8,033,783 B2 | 10/2011 | Ishikawa et al. | |
| 8,136,763 B2 | 3/2012 | Saint-Jalmes et al. | |
| 8,403,266 B2 | 3/2013 | Fokken et al. | |
| 8,519,824 B1 | 8/2013 | Rankin et al. | |
| 8,636,249 B2 | 1/2014 | Conen et al. | |
| 8,701,221 B2 | 4/2014 | Topcu | |
| 8,707,864 B2 | 4/2014 | Fritz et al. | |
| 8,794,569 B1 | 8/2014 | Ohlmann et al. | |
| 8,939,403 B2 * | 1/2015 | Hacker ................ | A47B 96/025 244/118.5 |
| D743,311 S | 11/2015 | Weiner et al. | |
| 9,322,192 B2 * | 4/2016 | Burd ....................... | E05C 3/044 |
| 9,328,543 B2 * | 5/2016 | Burd ...................... | E05C 19/009 |
| 9,359,078 B2 | 6/2016 | Burd | |
| 9,403,603 B2 * | 8/2016 | Hozumi ............ | B64D 11/0007 |
| 9,415,872 B2 | 8/2016 | Godecker et al. | |
| 9,415,873 B2 * | 8/2016 | McIntosh ............... | B64D 11/04 |
| 9,523,506 B2 * | 12/2016 | Lee ....................... | B64D 11/00 |
| 9,624,662 B1 | 4/2017 | Hall et al. | |
| 9,637,236 B2 | 5/2017 | Vandewall et al. | |
| 9,695,619 B2 * | 7/2017 | Burd ..................... | E05C 19/009 |
| 9,802,703 B2 | 10/2017 | Moran | |
| 9,822,808 B2 | 11/2017 | Rajeev | |
| D807,265 S | 1/2018 | McNutt | |
| D811,970 S | 3/2018 | Lokers | |
| D811,971 S | 3/2018 | Lokers | |
| 9,929,482 B2 | 3/2018 | Ceulen et al. | |
| D818,921 S | 5/2018 | Pelletier et al. | |
| 9,957,050 B2 | 5/2018 | Moran | |
| 9,987,902 B2 | 6/2018 | Burd | |
| 9,994,299 B2 | 6/2018 | Aske et al. | |
| D826,124 S | 8/2018 | Unveren | |
| 10,077,707 B2 | 9/2018 | Roy et al. | |
| 10,087,664 B2 | 10/2018 | Auriac | |
| D834,498 S | 11/2018 | Webb | |
| D834,499 S | 11/2018 | Nixon | |
| 10,124,896 B2 | 11/2018 | Sieben et al. | |
| 10,137,974 B2 | 11/2018 | Ahlen et al. | |
| 10,137,987 B2 * | 11/2018 | Burd ..................... | B62B 5/0447 |
| 10,214,276 B2 | 2/2019 | Hussain | |
| 10,315,765 B2 * | 6/2019 | Roth ................ | B64D 11/0007 |
| 10,329,005 B2 | 6/2019 | Nandalochana et al. | |
| 10,392,113 B2 | 8/2019 | Truemper | |
| 10,472,068 B2 * | 11/2019 | Coombs ................... | B64F 5/00 |
| 2001/0050519 A1 | 12/2001 | Kasuya | |
| 2003/0019976 A1 | 1/2003 | Cheung | |
| 2005/0121978 A1 | 6/2005 | McAvoy | |
| 2006/0060181 A1 | 3/2006 | Sasaki et al. | |
| 2006/0145002 A1 | 7/2006 | Loon | |
| 2006/0186268 A1 | 8/2006 | Harrington et al. | |
| 2007/0228216 A1 | 10/2007 | Wenstrom | |
| 2008/0001031 A1 * | 1/2008 | Doebertin ............. | B64D 11/04 244/118.1 |
| 2009/0261200 A1 | 10/2009 | Saint-Jalmes et al. | |
| 2009/0314889 A1 | 12/2009 | Baatz et al. | |
| 2010/0140398 A1 | 6/2010 | Cunningham et al. | |
| 2010/0155391 A1 | 6/2010 | Koschberg et al. | |
| 2010/0175410 A1 | 7/2010 | Lee et al. | |
| 2010/0181425 A1 | 7/2010 | Guering et al. | |

(56) References Cited

U.S. PATENT DOCUMENTS

| | | |
|---|---|---|
| 2010/0195317 A1 | 8/2010 | Oketani et al. |
| 2010/0219292 A1 | 9/2010 | Saint-Jalmes et al. |
| 2010/0308190 A1 | 12/2010 | Tkocz |
| 2011/0090064 A1 | 4/2011 | Dahms et al. |
| 2011/0101160 A1 | 5/2011 | Gomes et al. |
| 2011/0148664 A1 | 6/2011 | Shiomori et al. |
| 2011/0179626 A1 | 7/2011 | Weber et al. |
| 2011/0210203 A1 | 9/2011 | Chua et al. |
| 2011/0215199 A1 | 9/2011 | Lee |
| 2011/0278324 A1 | 11/2011 | Kilian et al. |
| 2011/0304161 A1 | 12/2011 | Behjat et al. |
| 2012/0111069 A1 | 5/2012 | Padjen et al. |
| 2013/0047657 A1 | 2/2013 | Oswald et al. |
| 2013/0187000 A1 | 7/2013 | Godecker et al. |
| 2013/0206903 A1 | 8/2013 | Savian et al. |
| 2013/0248649 A1 | 9/2013 | Burd |
| 2013/0248652 A1 | 9/2013 | Godecker et al. |
| 2013/0256249 A1 | 10/2013 | Burd |
| 2013/0257065 A1* | 10/2013 | Burd .................. B64D 11/0007 292/175 |
| 2013/0259562 A1 | 10/2013 | Burd |
| 2014/0014436 A1 | 1/2014 | Nguyen et al. |
| 2014/0044913 A1 | 2/2014 | Burd |
| 2014/0048650 A1 | 2/2014 | Schliwa et al. |
| 2014/0209741 A1 | 7/2014 | Boenning et al. |
| 2014/0212241 A1 | 7/2014 | Burd et al. |
| 2014/0238064 A1 | 8/2014 | Hawkins et al. |
| 2014/0263835 A1 | 9/2014 | Godecker et al. |
| 2014/0339363 A1 | 11/2014 | Moje et al. |
| 2014/0353425 A1 | 12/2014 | Boren, Jr. et al. |
| 2014/0355282 A1 | 12/2014 | Cuddy et al. |
| 2014/0367516 A1 | 12/2014 | Lange et al. |
| 2014/0367517 A1 | 12/2014 | Eckel et al. |
| 2015/0028670 A1 | 1/2015 | Boodaghians et al. |
| 2015/0059385 A1 | 3/2015 | Burd |
| 2015/0076981 A1 | 3/2015 | Hacker et al. |
| 2015/0099446 A1 | 4/2015 | Burd |
| 2015/0211670 A1 | 7/2015 | Edmonds et al. |
| 2015/0284097 A1* | 10/2015 | Schliwa .................. B64D 11/02 244/118.6 |
| 2015/0298793 A1 | 10/2015 | Fox et al. |
| 2015/0314872 A1* | 11/2015 | Holtorf .................. B64D 11/04 244/118.5 |
| 2015/0367931 A1 | 12/2015 | Cullen et al. |
| 2016/0027427 A1 | 1/2016 | Yang et al. |
| 2016/0046380 A1 | 2/2016 | Ng et al. |
| 2016/0096624 A1 | 4/2016 | McIntosh |
| 2016/0236785 A1* | 8/2016 | McIntosh ............... B64D 11/00 |
| 2016/0258188 A1* | 9/2016 | Vandewall .............. E05B 41/00 |
| 2016/0264246 A1* | 9/2016 | Young .................... B64D 11/04 |
| 2016/0288896 A1 | 10/2016 | Aske et al. |
| 2016/0325570 A1 | 11/2016 | Oppenheimer et al. |
| 2016/0347437 A1 | 12/2016 | Mamushkin et al. |
| 2017/0021929 A1 | 1/2017 | McKee et al. |
| 2017/0043857 A1* | 2/2017 | Seibt ..................... B64C 1/1407 |
| 2017/0057637 A1 | 3/2017 | Cole |
| 2017/0156499 A1 | 6/2017 | Kane et al. |
| 2017/0204635 A1* | 7/2017 | Vandewall .............. E05B 41/00 |
| 2017/0290935 A1 | 10/2017 | Boodaghians et al. |
| 2017/0304759 A1 | 10/2017 | Foenss |
| 2017/0335869 A1 | 11/2017 | Bui et al. |
| 2017/0341750 A1 | 11/2017 | Gonnsen |
| 2017/0356222 A1 | 12/2017 | Braz |
| 2018/0016012 A1 | 1/2018 | Burd et al. |
| 2018/0016014 A1 | 1/2018 | Burd et al. |
| 2018/0044023 A1 | 2/2018 | Nojiri et al. |
| 2018/0072425 A1 | 3/2018 | Weifenbach |
| 2018/0105253 A1 | 4/2018 | Singleton et al. |
| 2018/0162532 A1 | 6/2018 | Swanson et al. |
| 2018/0216644 A1 | 8/2018 | Mateo |
| 2018/0258686 A1* | 9/2018 | Christenson ............... E06B 5/00 |
| 2018/0273157 A1* | 9/2018 | Hoogeveen ........... B64C 1/1461 |
| 2019/0210729 A1* | 7/2019 | Riedel ........................ F16B 5/02 |
| 2019/0210730 A1* | 7/2019 | Riedel .................... B64D 11/04 |
| 2019/0308727 A1* | 10/2019 | Riedel ................ B64D 11/0015 |
| 2019/0308729 A1* | 10/2019 | Riedel ................ B64D 11/0007 |
| 2020/0181942 A1* | 6/2020 | Bauer .................... E05B 73/00 |

FOREIGN PATENT DOCUMENTS

| | | |
|---|---|---|
| EP | 2830941 B1 * | 9/2018 |
| FR | 3029162 B1 | 3/2018 |
| JP | H05322379 A | 12/1993 |

OTHER PUBLICATIONS

Harris (ed.) Noise Control Manual, 1991, Springer Science + Business Media, pp. 45-52. (Year: 1991).

* cited by examiner

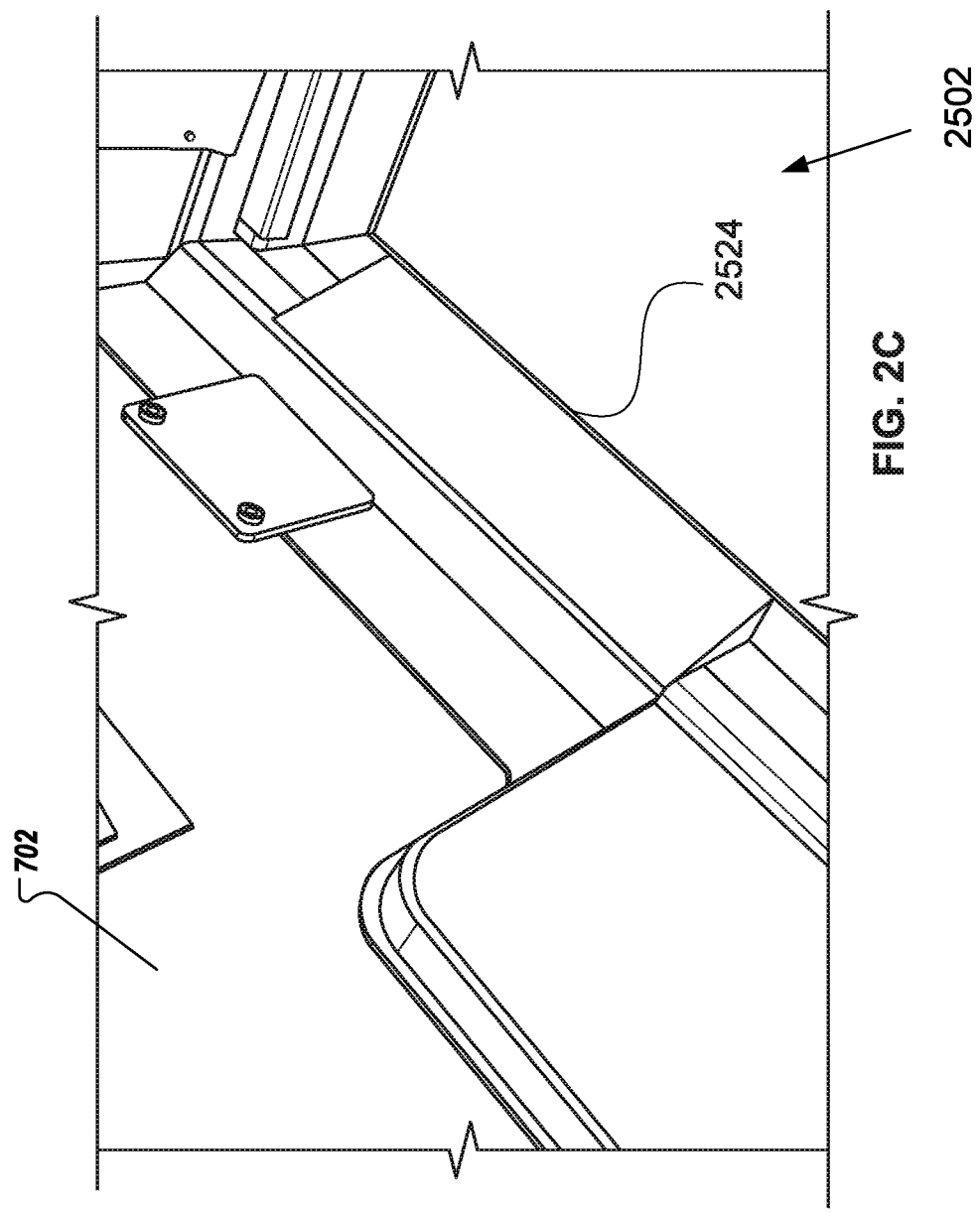

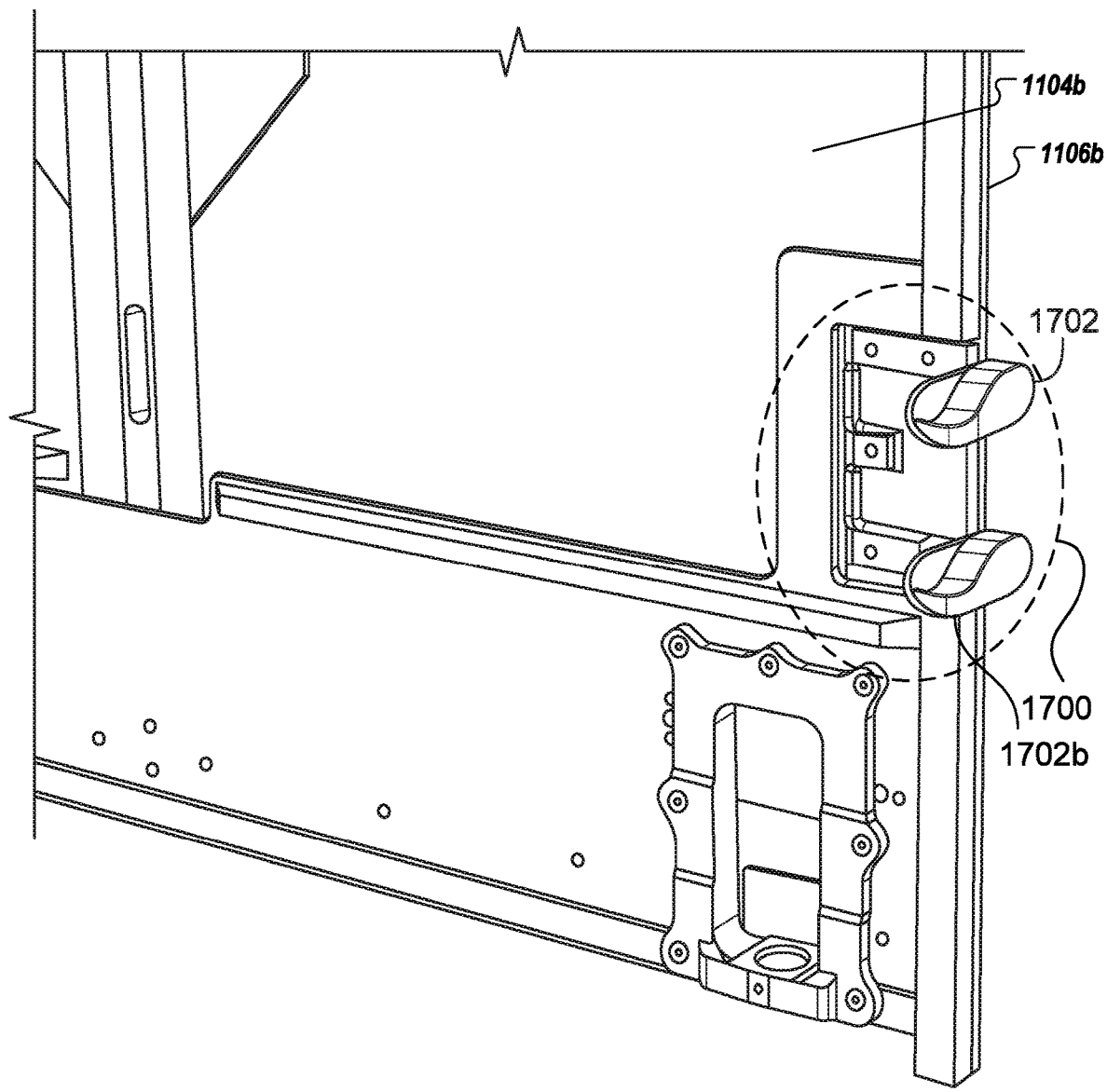

AIRCRAFT SERVICE TROLLEY AND GALLEY ENCLOSURE THEREFOR

RELATED APPLICATIONS

This application claims priority to U.S. Provisional Patent Application Ser. No. 62/361,460, entitled "Aircraft Galley Monument Systems, Apparatus and Methods for Use Thereof," filed Jul. 12, 2016. This application incorporates by reference, in its entirety, U.S. patent application Ser. No. 14/474,725 entitled "Mobile Galley Cart with Heating, Cooling and Braking Functionality" and filed Sep. 2, 2014. All above identified applications are hereby incorporated by reference in their entireties.

BACKGROUND

The present disclosure relates to aircraft galley systems for commercial aircraft. In-flight catering services typically incorporate self-contained refrigeration units that are cooled to prevent spoilage of food prior to distribution to passengers, and to keep beverages at desired serving temperatures, as well as separate ovens for heating food in the preparation of hot meals to be served aboard aircraft. Currently space must be allocated for each of the heating and cooling devices separately, either in the same galley or in different galleys.

A modular aircraft galley may utilize several vertical and horizontal structural elements for accommodating slide-in devices or items of equipment such as galley inserts or galley appliances. The galley can include structural elements that form an essentially unchangeable basic element providing connection elements for the mechanical connection and interfacing of the slide-in devices or items of equipment, so that various kinds of the slide-in devices or items of equipment can be interchanged at various locations. Such modular aircraft galley systems typically use the outer case of a galley insert or galley appliance, such as an oven, refrigerator or other such device, as the principal mechanism for locating the galley insert or galley appliance in an inner cavity or liner of a galley.

SUMMARY OF ILLUSTRATIVE EMBODIMENTS

The forgoing general description of the illustrative implementations and the following detailed description thereof are merely exemplary aspects of the teachings of this disclosure, and are not restrictive.

According to certain embodiments, a retaining assembly secures an equipment item within an aircraft galley compartment. The retaining assembly may include a turn button assembly including a turn button connected to a front edge of the galley compartment to secure the equipment item within the galley compartment. The turn button rotates between a first position for allowing insertion or release of the equipment item from the galley compartment and a second position for securing the equipment item within the galley compartment. A turn button recess on an inner surface of a panel door that is coupled to an edge of an opening for the galley compartment receives the turn button of the turn button assembly when the turn button is in the second position to allow the panel door to fully close over the opening for the galley compartment, which allows for compliance with a regulatory requirement for a visual indication that a retaining door is not secured and may cause a hazardous situation.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 2A-2C illustrate example pedal lifters for use with a galley trolley;

FIGS. 3A-3B illustrate perspective views of a turn button assembly for galley cart compartments without doors;

DETAILED DESCRIPTION OF ILLUSTRATIVE EMBODIMENTS

Figure 1A:
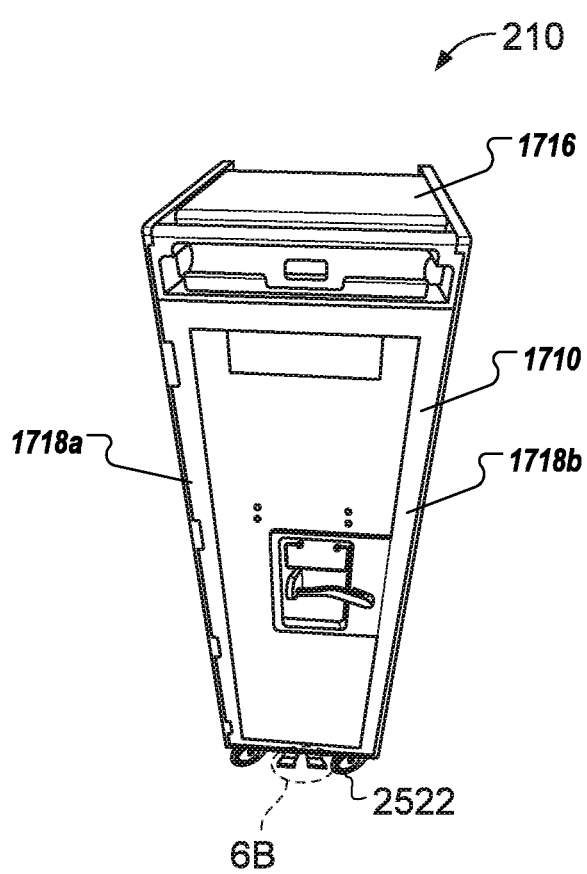
FIGS. 1A-1C illustrate an example embodiment of a galley trolley.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure may be directed to galley compartments of a galley monument within an aircraft. In some implementations, the galley compartments may include retention assemblies that are configured to secure a container, such as a trolley, within the galley compartment, such as within a trolley bay of a galley monument. The retention assemblies may include turn buttons that are rotatably connected to a front edge of the galley compartment that rotate between a position for securing the container within the compartment and a position for releasing or inserting the container into the compartment. In some examples, an inner surface of a door for the galley compartment may include a complementary recess configured to surround and enclose the turn buttons within the recess so that the door can fully close over the opening for the galley compartment when the turn buttons are in the position for securing the container within the compartment. The recess may provide an additional mechanism to ensure that the container is completely secured within the compartment by the turn buttons and/or the door so that the container does not inadvertently slide out of the compartment during unexpected movements of the aircraft.

Figure 2A:
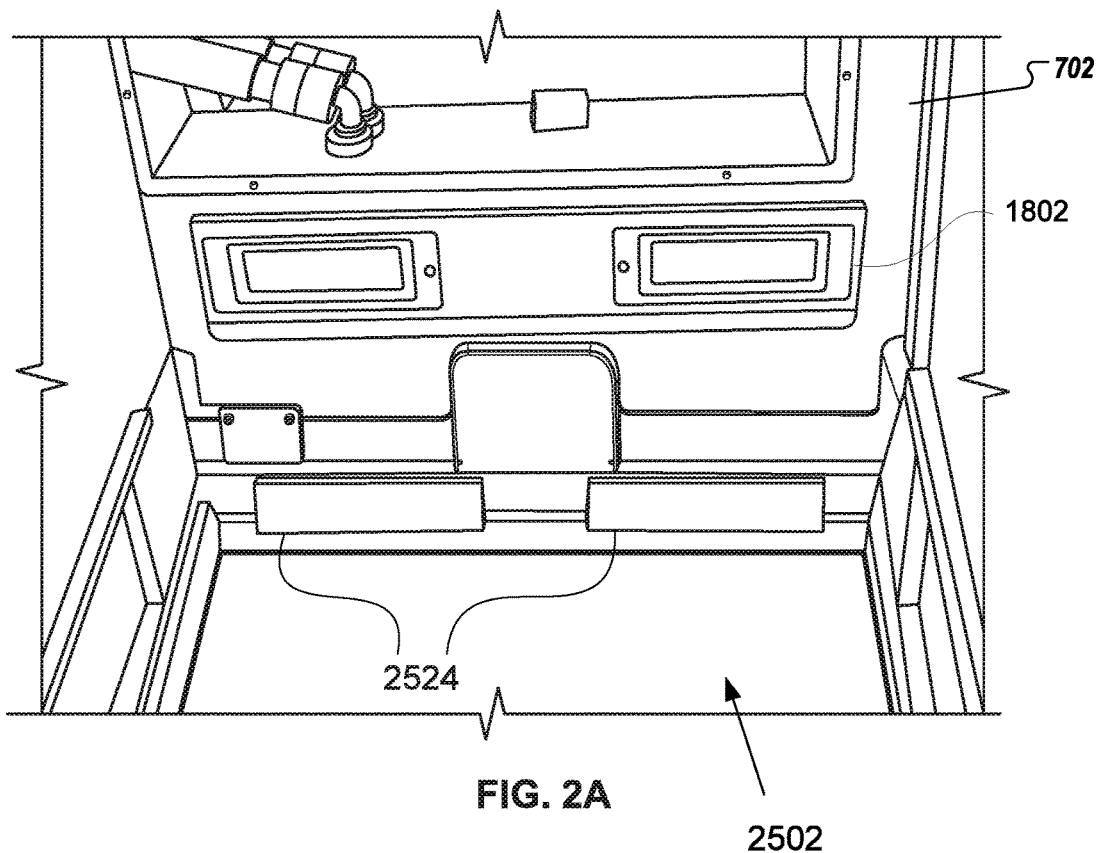
Figure 2B:
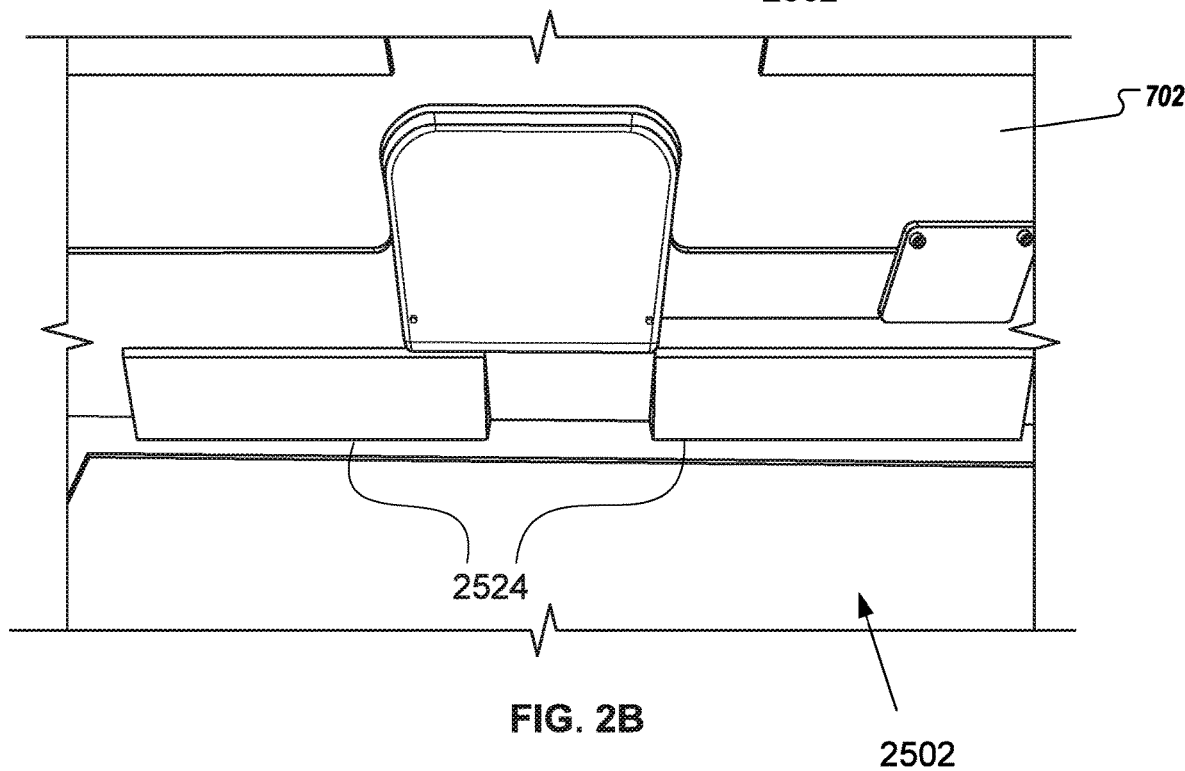
Figure 3A:
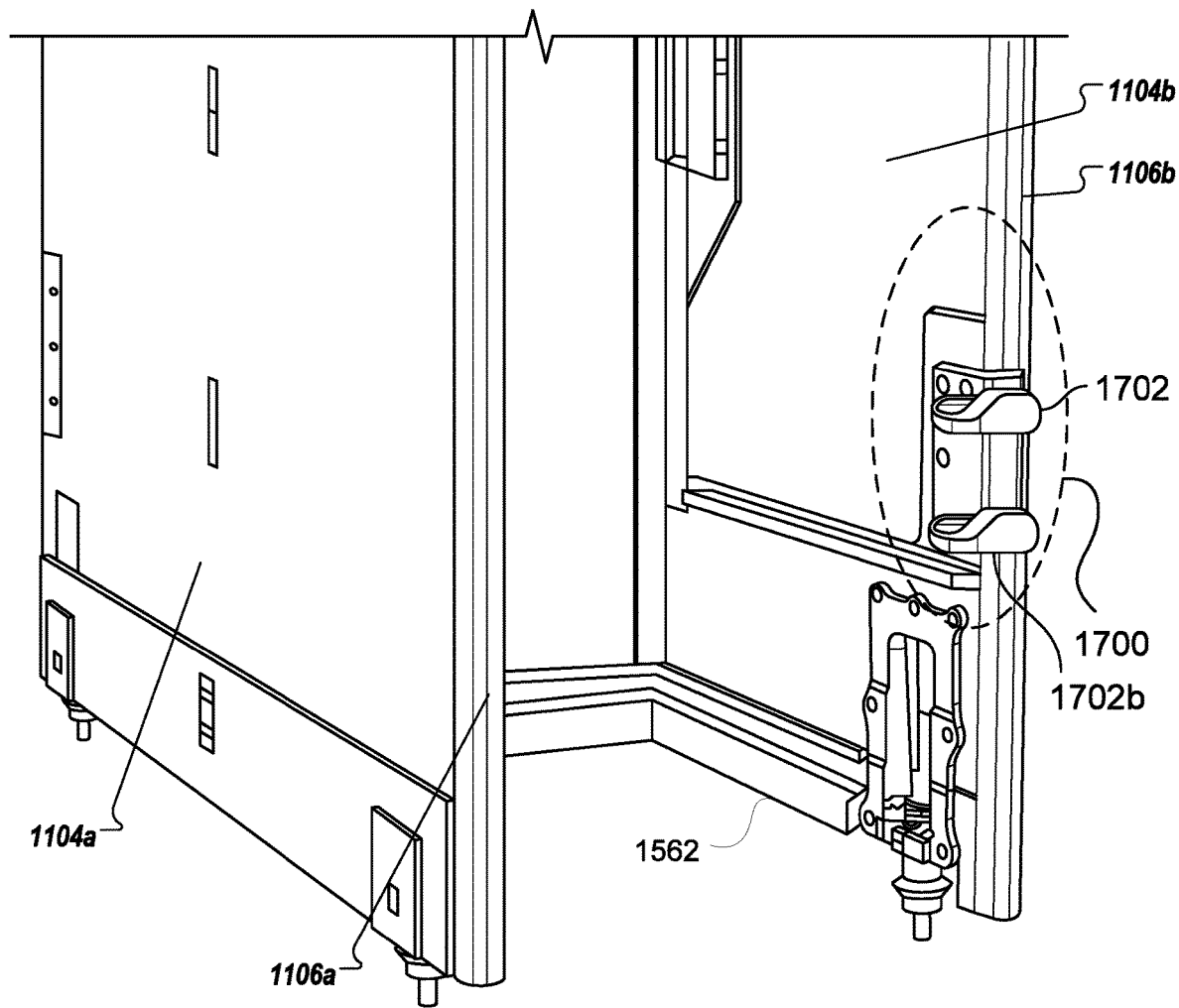
Figure 4A:
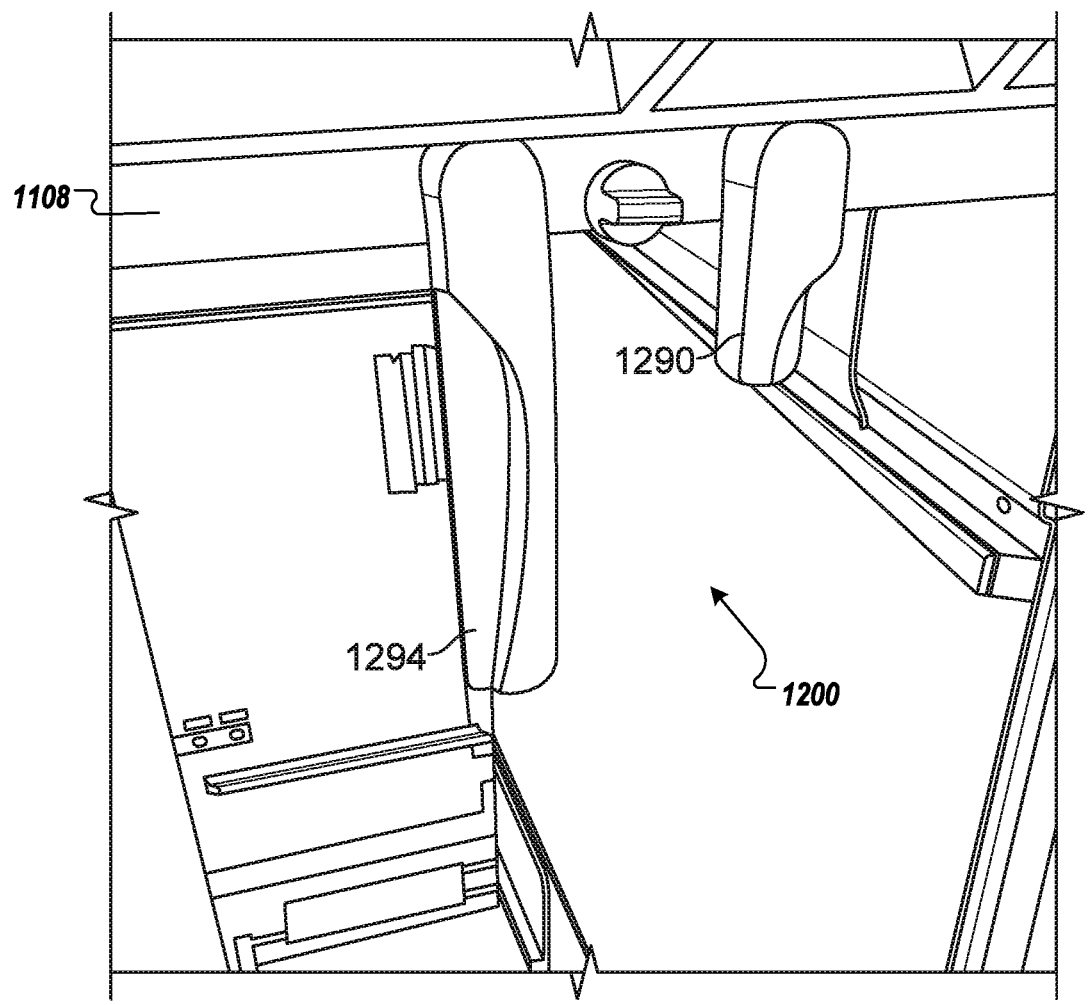
FIGS. 4A-4B illustrate front and rear views of a galley turn button for galley cart compartments with doors.
Figure 4B:
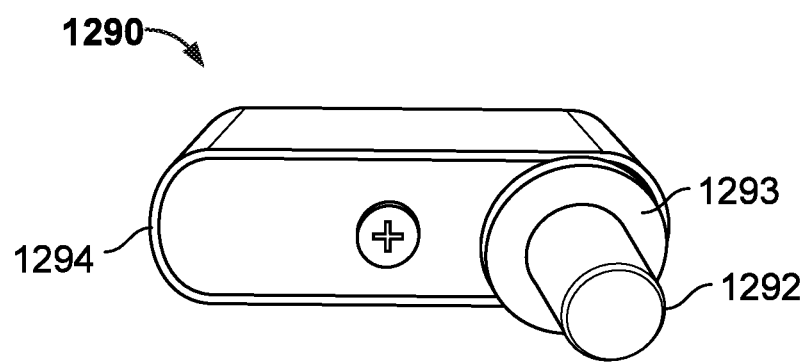

Turning to the figures, FIGS. 1A-4B illustrate exemplary implementations of a trolley and retaining devices for retaining the trolley within a trolley bay. For example, FIGS. 1A-1C illustrate views of an aircraft trolley, FIGS. 2A-2C illustrate views of an interior of a trolley bay, FIGS. 3A-3B illustrate views of a trolley bay including a turn button assembly for retaining a trolley within the trolley bay, and FIGS. 4A-4B illustrate implementations of turn button assemblies.

In some implementations, the trolley bay 2502 may include at least one turn button assembly 1200, 1700 with at least one turn button 1290, 1294 (FIG. 4A) or 1702, 1702b (FIGS. 3B and 5D) that are configured to secure a trolley within the trolley bay 2502. In one example, the turn buttons 1290, 1294 of the turn button assembly 1200 have different lengths, while the turn buttons 1702, 1702b have substantially equal lengths. References to operation of the turn buttons of the turn button assemblies 1200, 1700 can be understood to apply to either one or both of the turn button assemblies.

In some implementations, each of the turn buttons or retaining devices described herein may be designed to withstand predetermined crash loading requirements associated with trolleys and standard units. In examples where multiple adjacently mounted turn buttons are configured to cooperatively secure a trolley or other type of container within a compartment or trolley bay, each of the adjacently mounted turn buttons is designed to individually secure the trolley or container within the compartment or trolley bay under the predetermined crash loads to take into account failure of one or more of the adjacently mounted turn buttons. In one example, the design crash loading for the turn buttons may correspond to approximately 9 G times a weight of the trolley/standard unit, which for full a trolley may be 120 kg (two times a half-size trolley) and for a full standard unit may be 50 kg (accounting for two standard units). In addition, an empty trolley may weigh approximately 11 kg, and an empty standard unit may have a maximum weight of approximately 2 kg.

Figure 1B:
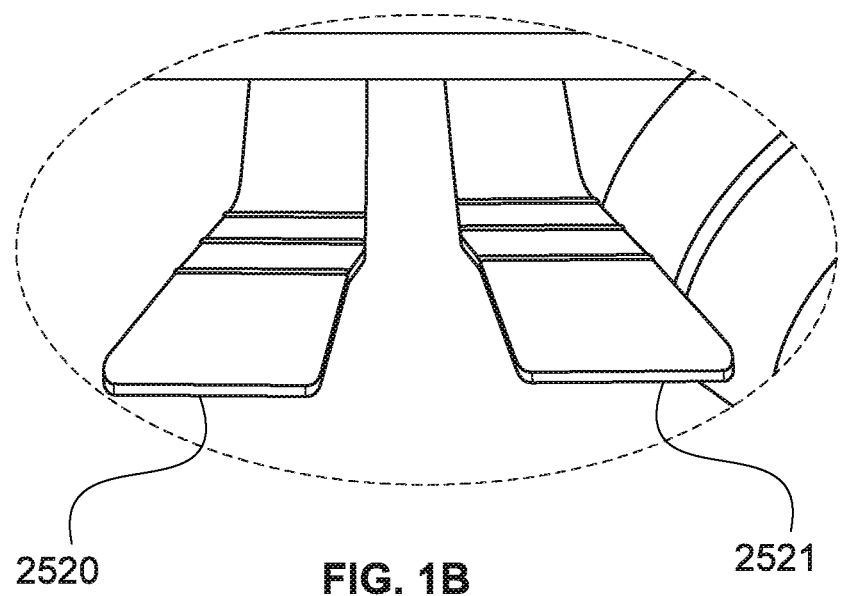
Figure 1C:
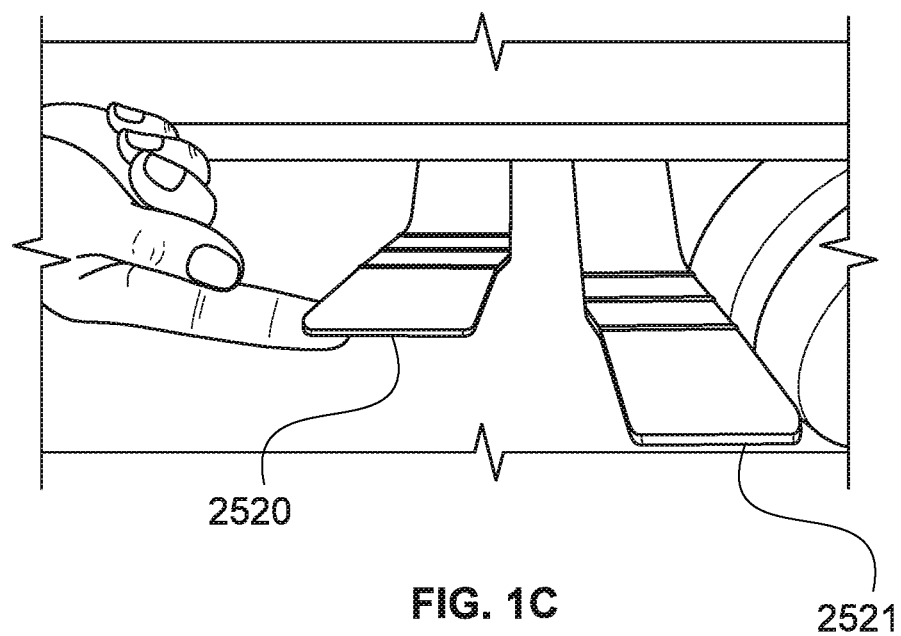

FIGS. 1A-1C provide an illustrative example of an exemplary trolley 210 that includes features that may be represented in any type of trolley that can be inserted into any trolley bay described herein such as a removable full size trolley, a full size chilled trolley, a half size trolley, and/or a half size chilled trolley positioned beneath a work surface of a galley monument. For example, FIG. 1A illustrates a front perspective view of the trolley 210, which may be secured within a galley monument, in some examples, by at least one turn button assembly 1200 and/or 1700 (FIGS. 3B and 4A). In some implementations, the trolley 210 may be designed to fit snugly within the trolley bay 2502 while still being able to slide smoothly into and out of the trolley bay 2502. For example, an upper surface 1716 of the trolley 210 may abut or be disposed adjacent to a lower face of a work deck panel 1108 separating the trolley bay 2502 from a work deck and/or compartments above the work deck panel 1108. Additionally, side surfaces 1718a,b may abut or be disposed adjacent to inner surfaces of the first and second side panels 1104a,b of the trolley bay 2502.

In some implementations, the trolley 210 may include a brake pedal 2520 and a brake release pedal 2521 positioned below a bottom surface of the trolley 210 at a front end and a number of casters 2522. In some implementations, the casters 2522 may allow the trolley 210 to be moved and steered while in service, and the brake pedal 2520 may be configured to actuate a lock for at least one caster 2522 to prevent the trolley 210 from rolling when it is desired for the trolley to be stationary, such as when the trolley 210 is inserted within the trolley bay 2502. In some examples, the brake pedal 2520 may be configured to be foot operated, by pushing up or pressing down, and may apply a braking mechanism, such as a brake pad, to some or all of the casters 2522 on the trolley 210. In some implementations, a second brake pedal and a second brake release pedal (not shown) may be positioned at a rear end of the trolley 210 such that the breaking mechanism can be actuated from either side of the trolley 210.

In one example, the brake pedal 2520 is configured to engage a brake on the trolley 210 upon being pressed in a downward direction, and a brake release pedal 2521 is configured to release the brake upon being pressed in a downward direction. In some aspects, upward movement of the pedals 2520, 2521 may not have an effect upon engagement or disengagement of the pedals 2520, which may allow the trolley 210 to be inserted further into a galley compartment due to the upward movement of the pedals 2520, 2521 that is caused by contact of the pedals 2520, 2521 with a rear surface of the compartment. In addition, the brake pedal 2520 may be colored green to indicate that engaging the brake pedal 2520 may place the trolley 210 in a safe condition, and the brake release pedal 2520 may be colored red to indicate that disengaging the brake may place the trolley 210 in an unsafe condition. Engagement in an upward direction may be preferable, for example, to provide braking clearance even in circumstances where floor debris may interfere with a downward depression of a brake pedal. However, engagement in a downward direction may be preferable to avoid injury to footwear (e.g., scuffing, other wear & tear) or to the toes of the operator.

In one example, the brake pedal 2520 is configured to engage a brake on the trolley 210 upon being pressed in a downward direction, and the same brake pedal 2520 is configured to release the brake upon being pressed further in a downward direction and then released.

The first and second brake pedals 2520 may be operated independently to allow brake application by a user from either end of the trolley 210. Further, this allows either end of the trolley 210 to be inserted into a trolley bay 1706 first, reducing the effort and space needed compared with having to turn a trolley 210 around to orient it a particular way for storage. In addition, having the ability to control the brakes from either end of the trolley 210 may allow flight attendants to provide aisle service to passengers from either end of the trolley 210. An example cart design employing independent front and rear braking mechanisms, for example, is described in U.S. patent application Ser. No. 14/474,725 entitled "Mobile Galley Cart with Heating, Cooling and Braking Functionality" and filed Sep. 2, 2014, the contents of which are incorporated by reference herein in its entirety.

The installation and use of ductwork in a galley monument to provide chilled air can affect the depth available in the trolley bay for accommodating a trolley within an interior portion of the trolley bay. For example, a back surface 702 of the trolley bay 2502 may be extended forward toward a front surface of the trolley bay 2502 due to ductwork or equipment disposed behind the back surface 702 of the trolley bay 2502 (FIGS. 2A-2C) or a floor seal retainer 1562 (FIG. 3A) thereby shortening a length of the trolley bay 2502. Because of the shortened dimensions caused by the ductwork for a galley extraction system, a brake pedal 2520 and/or brake release pedal 2521 (see FIGS. 1B-1C) located on an end of an exemplary trolley 210 facing toward the back surface and ductwork of the trolley bay 2502 may interfere with a floor seal retainer 1562 (FIG. 3A) positioned at the back of the trolley bay 2502 and prevent the trolley 210 from being fully inserted into the trolley bay 2502. Therefore, the trolley bay 2502 may include a pedal lifter 2524 (FIGS. 2A-2B) positioned against the back surface 702 of the trolley bay 2502, which may deflect or push the brake pedal 2520 and/or the brake release pedal 2521 of the trolley 210 in an upward direction as the trolley 210 is pushed into the trolley bay 2502, such that the brake pedal 2520 and/or the brake release pedal 2521 does not interfere with the floor seal retainer 1562.

FIGS. 2A-2C represent example pedal lifters 2524 positioned at a lower, rear surface 702 of a galley bay. In some implementations, the brake release pedals 2521 may be actuated by one or more pedal lifters 2524 positioned inside the trolley bay 2502, toward the rear surface 702 such that the second brake pedal 2520 located on at a rear end of the trolley 210 may make contact with the pedal lifters 2524 as the trolley 210 is pushed toward the rear of the trolley bay 2502. In some examples, each pedal lifter 2524 may be shaped to deflect the brake pedal 2520 and brake release pedal 2521 located at the rear end of the trolley 210 beyond a natural resting position, allowing the trolley 210 to be pushed further into the trolley bay 2502, using more available storage space within the galley bay 2502. In some implementations, upon sliding the trolley 210 into the trolley bay 2502, the brake pedal 2520 on the front end of the trolley 210 may be depressed to lock the trolley 210 into place. Because the brake pedals 2520 on the front and rear ends of the trolley 210 may be independently operable, activating the brake pedal 2520 on the front end of the trolley 210 may not cause movement of the brake pedal 2520 on the rear end of the trolley 210 (e.g., pressed against a rear panel of the trolley bay 2502).

In some examples, because space aboard an aircraft is at a premium, dimensions of trolley bays may be precisely designed to occupy a minimal area. In galleys with floor seal retainers 1562 (FIG. 3A) or galley equipment, trolley brake pedals 2520 and brake release pedals 2521 may experience interference with a rear surface 702 of the trolley bay 2502. Further, because trolleys may be retained within trolley bays by restraints, such as by turn button assemblies 1200 and/or 1700, the trolleys may be configured to fit within the trolley bays in a very precise manner for the restraints to operate correctly. Therefore, the at least one pedal lifter 2524 may be positioned along a lower portion of the rear surface or wall of the trolley bay 2502. In some implementations, the pedal lifter 2524 may be an angled ramp as shown in FIG. 2C, similar to a wedge, positioned to actuate an upward vertical movement of at least one of the trolley 210 brake pedal 2520 or brake release pedal 2521 to clear and rest above the floors seal retainers 1562 or other equipment as the trolley 210 is pushed toward the back wall of the trolley bay 1706.

In one example, the pedal lifter 2524 may be a separate component connected to at least one of the floor seal retainer 1562 or other equipment connected to the back wall and/or aircraft floor 103 within the trolley bay 2502. In another example, the pedal lifter 2524 may be formed as part of floor seal retainer 1562, and the pedal lifter 2524 may be replaced in conjunction with replacement of the floor seal retainer 1562.

Turning to FIGS. 3A-3B, perspective views of a turn button assembly 1700 for securing a trolley in a galley trolley bay, are illustrated. In some implementations, the turn button assembly 1700 may include turn buttons 1702, 1702b rotatably connected to a front, vertically-oriented, side edge 1106a,b of the galley trolley bay 2502. In some examples, the turn buttons 1702, 1702b may be positioned close to the aircraft floor so that they are positioned at or below the vertical position of the center of gravity (COG) of the trolley (e.g., trolley 210 as described in relation to FIG. 1A), in a case where the trolley 210 is positioned within the trolley bay 2502, to prevent fore/aft movement and rotation (pitch) of the trolley while experiencing flight or crash loads. For example, the turn button 1702 may be rotated to a first position such that a portion of the turn button 1702 may be positioned in the path of the trolley 210 in order to prevent the trolley 210 from rotating and inadvertently sliding out of the trolley bay 2502, which may occur when half trolley carts are inserted into the galley compartment 2502 and secured by the turn buttons 1702, 1702b. In addition, the turn button 1702 may be rotated to a position clear of the path of the trolley 210 and toward a side of the galley trolley bay 2502, allowing the trolley 210 to be released for use as needed. In one example, the turn button 1702 may be mounted flush with a front surface of the galley trolley bay 2502 so as not to project into a work space, for example, of a galley monument.

Figure 5A:
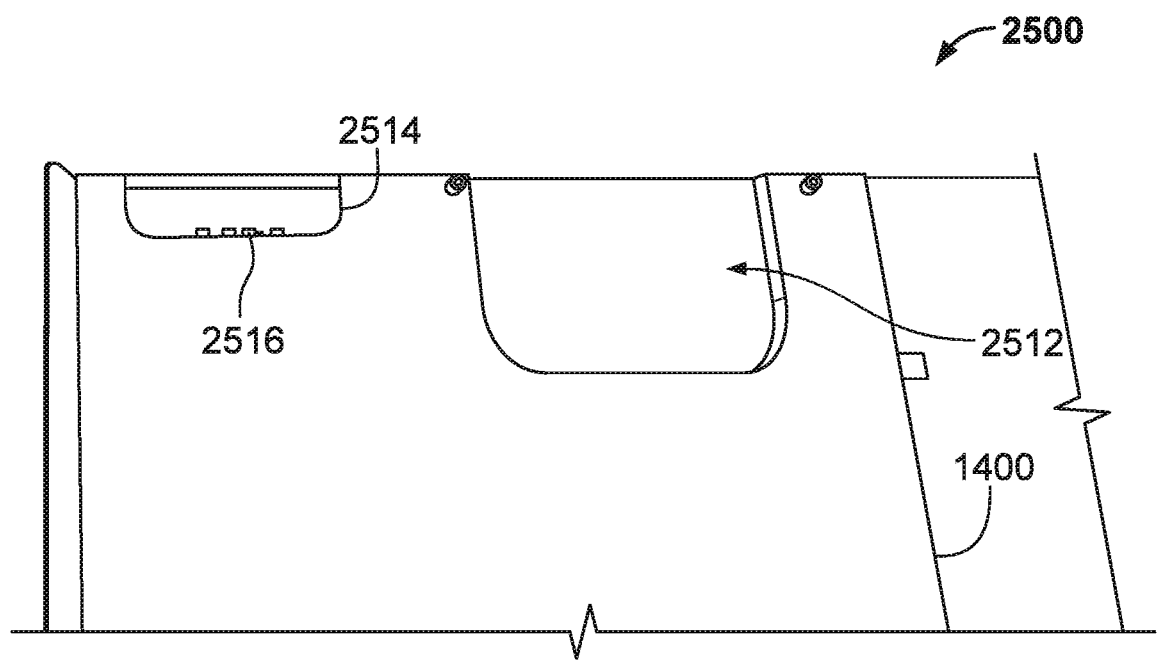
FIGS. 5A-5E illustrate various views of a closure prevention system.
Figure 5B:
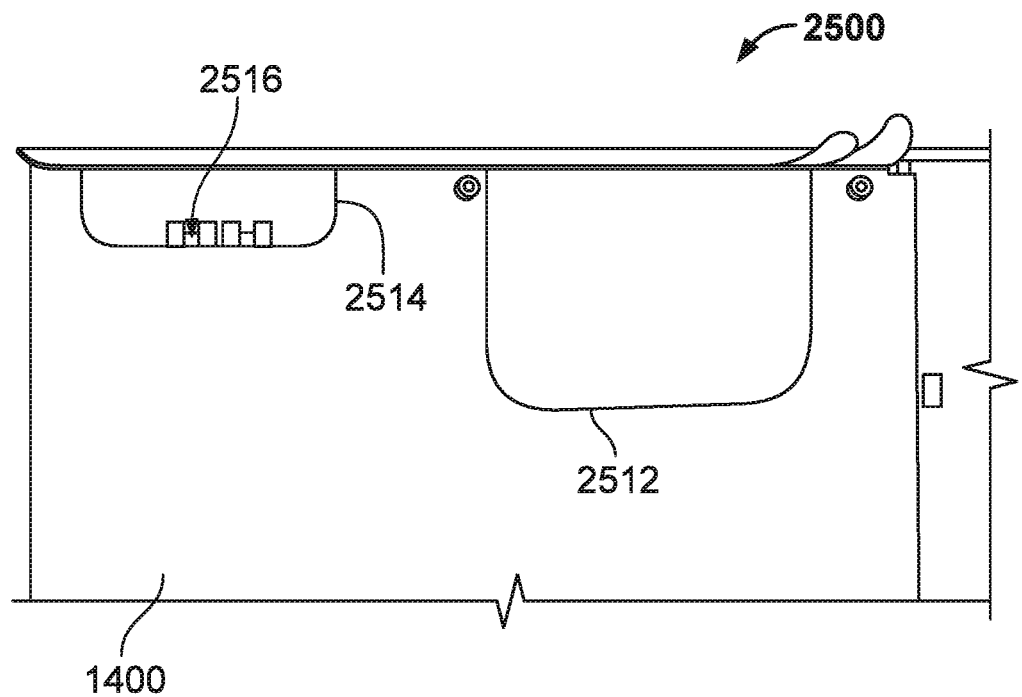
Figure 5C:
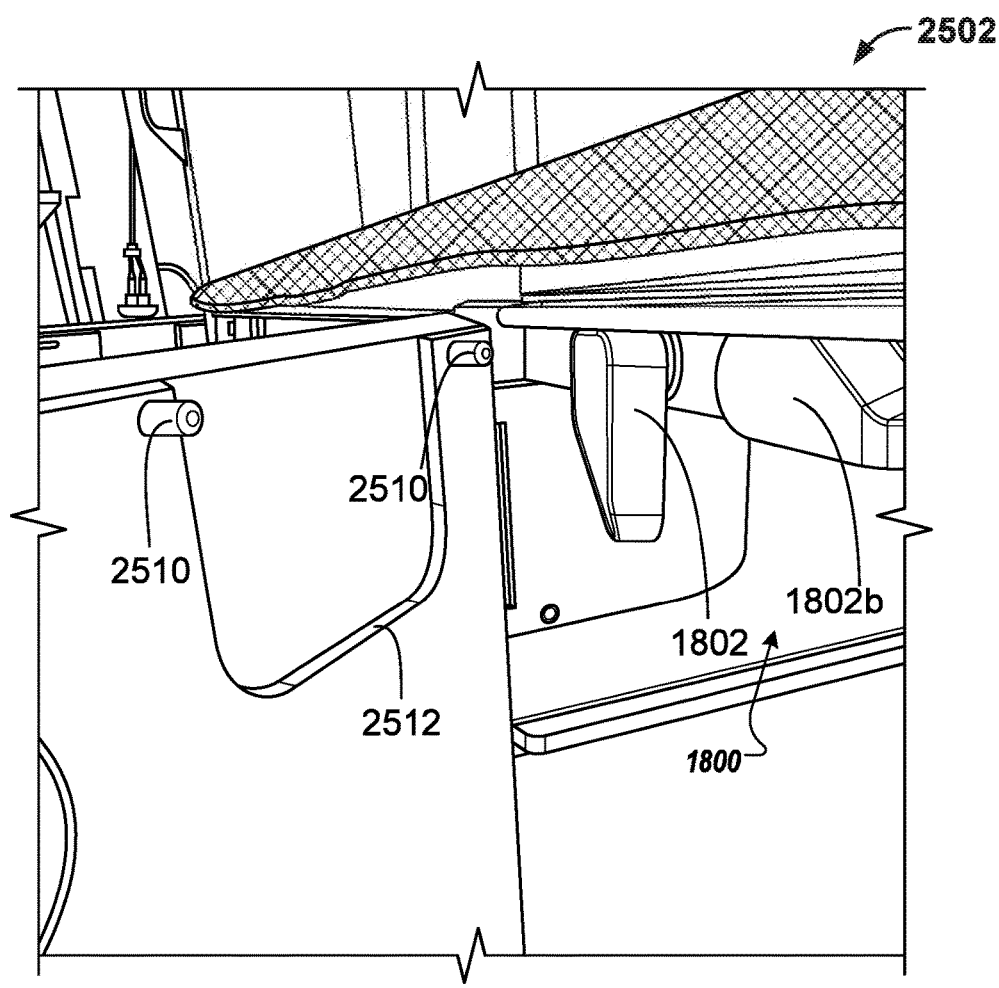
Figure 5D:
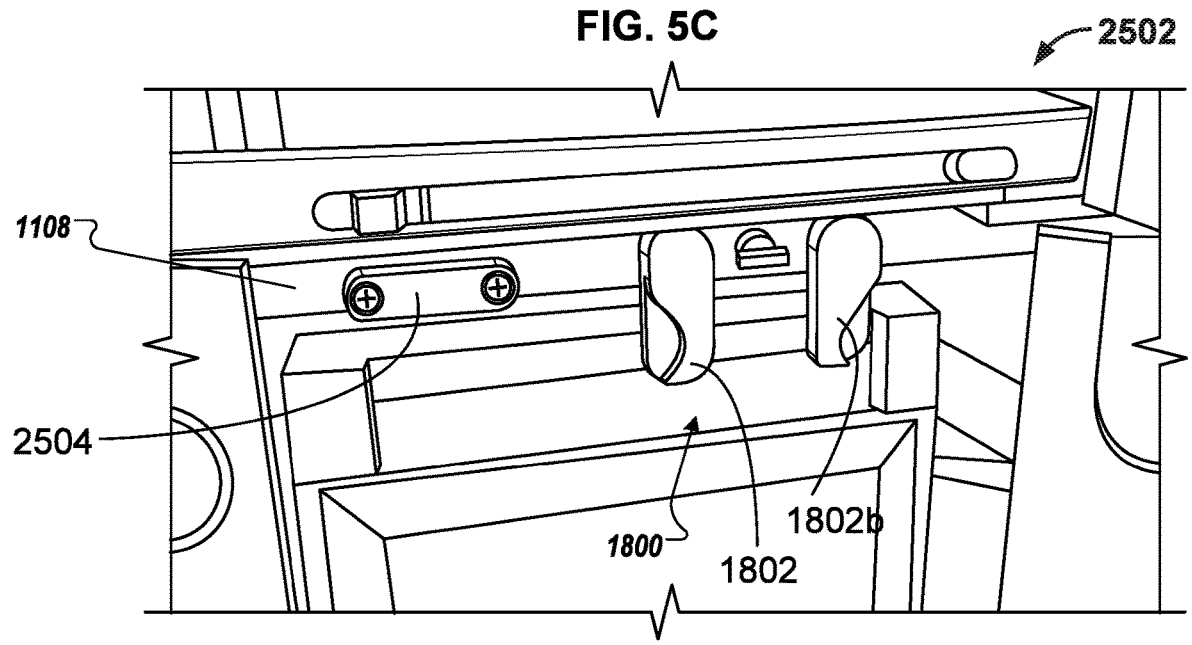
Figure 5E:
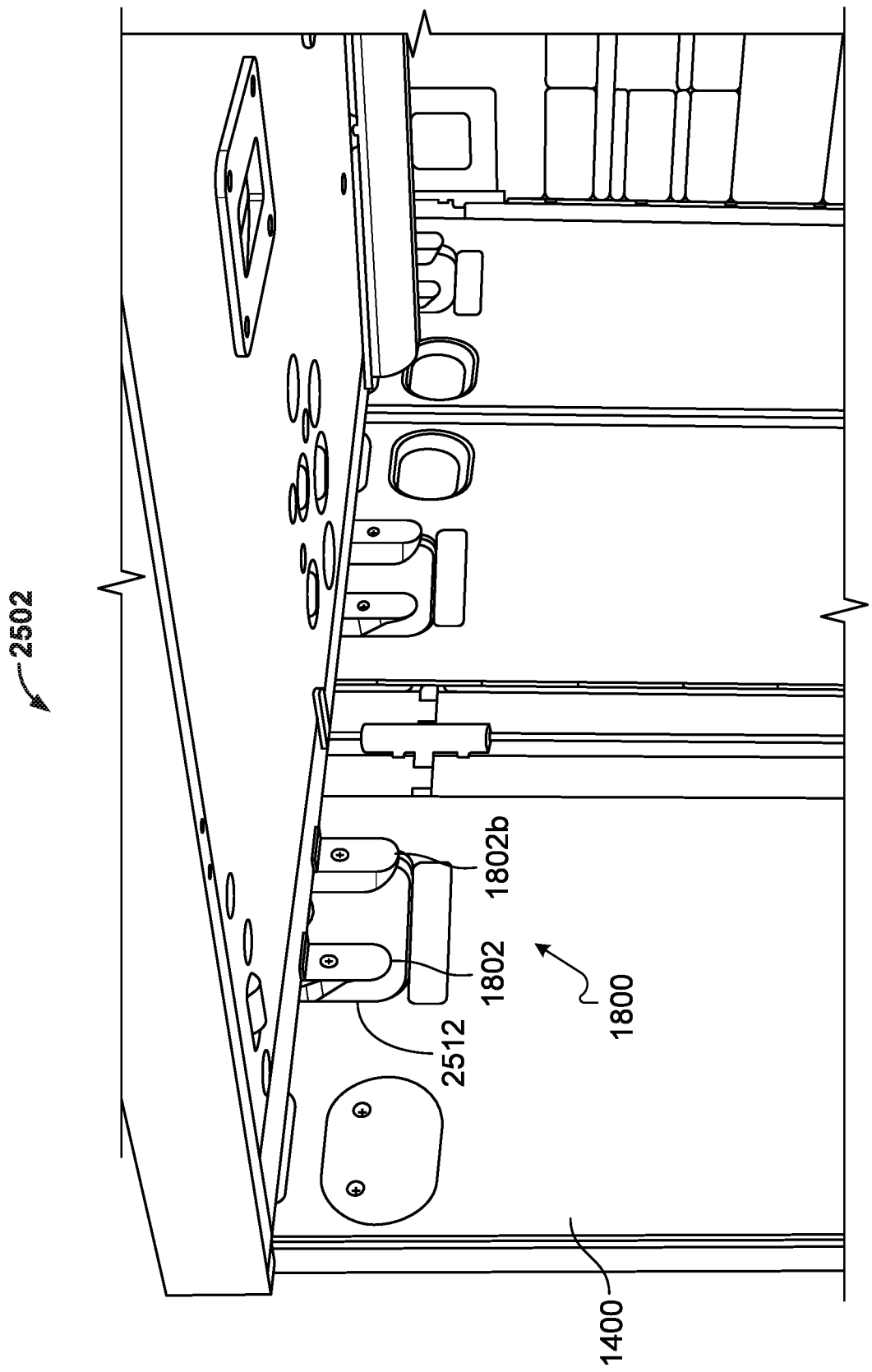

In some examples, the turn button assembly may also be mounted to a horizontal work deck panel 1108 positioned at an upper end of the trolley bay 2502, such as in the case of the turn button assembly 1200 (FIGS. 4A-4B) and/or the turn button assembly 1800 (FIGS. 5C-5E). In some implementations, a number of galley turn buttons 1290, 1294 (FIG. 4A) and 1802, 1802b (FIGS. 5C-5E) may also be mounted on a top edge of a trolley bay 2502 and may operate in a substantially similar way as the turn buttons 1702, 1702b of the turn button assembly 1700. In such an arrangement, the galley turn buttons 1290, 1802, 1802b may still maintain a locked position for a trolley 210 inserted into the trolley bay 2502 due to gravity even if the galley turn buttons 1290, 1802, 1802b were unable to maintain a horizontal open position without manual intervention, thus still being able to retain the trolley 210 within in the trolley bay 2502 even if the galley turn buttons 1290, 1802, 1802b experienced certain technical issues that prevent the turn buttons 1290, 1802, 1802b from remaining in an unlatched position, which may be referred to as a failure in safe mode condition.

Further, in some embodiments, the turn button assembly 1700 may include a second (redundant) turn button 1702b that may be rotatably connected to a front side edge 1106a,b of the galley trolley bay 2502 and may be located adjacent to the turn button 1702. In some implementations, the turn button 1702b may be designed to move synchronously with the turn button 1702. The redundant turn button 1702b, in one example, may provide an additional retention force on the trolley 210. In some examples, utilizing more than one turn button 1702, 1702b of the turn button assembly 1700 to secure a trolley 210 within the trolley bay 2502 may reduce a load each turn button 1702, 1702b may be subjected to while restraining a trolley 210 within the trolley bay 2502. Having an additional turn button 1702b to restrain the trolley 210 may be helpful in an event where the aircraft experiences turbulence or other situation that exposes the trolley 210 to increased forces that may cause the trolley 210 to slide into or out of the trolley bay 2502. Additional turn buttons 1702 may reduce the load each turn button 1702 is subjected to, increasing the likelihood the trolley 210 will remain in place during periods of unsteadiness within the aircraft, which allows the turn button assembly 1700 to meet an airworthiness requirement of having a primary and secondary retention capability in which each individual turn button 1702 or 1702b is capable of retaining the trolley 210 under crash load conditions. In another example, the redundant turn button 1702b may be provided as a failsafe mechanism, in the event that a primary turn button 1702 is damaged or fails to function. Redundant failsafe mechanisms, for example, may be required according to government regulations of commercial aircraft.

In some examples, the turn button assembly 1700 mounted to the side panel 1104a and/or 1104b (FIG. 3A) may be installed to prevent a half-sized trolley from rotating out from under the turn button assembly 1700 mounted to the work deck panel 1108 above the trolley bay 2502 in order to withstand "kick-up" loads. In addition, the turn button assembly 1700 mounted to the side panel 1104a and/or 1104b may be installed for trolley bays that may not include an outer panel door.

Additionally, for a trolley bay 2502 that includes a bay door 1400, the turn button assembly 1800 (FIGS. 5C-5E) may be mounted to the work deck panel 1108 above an opening for the trolley bay 2502 and may be positioned either on an interior side or an exterior side of the bay door 1400. In an example where the turn button assembly 1800 is located on an interior side of the bay door 1400, the turn button assembly 1700 may be configured such that the bay door 1400 cannot be fully closed when the trolley 210 is inside the trolley bay 2502 unless the turn button assembly 1800 is set in a position that retains the trolley 210 within the trolley bay 2502. In an implementation where the turn button assembly 1800 is positioned on an exterior side of the bay door 1400 (not shown), the turn button assembly 1800 may be configured such that the bay door 1400 cannot be fully closed when the trolley 210 is inside the trolley bay 2502 unless the turn button assembly 1800 is set to a release position for inserting or releasing the trolley 210 from the trolley bay 2502. Once the bay door 1400 is moved to the closed position, then the turn buttons 1802, 1802b may be rotated to the latched or secured position to secure the trolley 210 within the trolley bay 2502.

In some implementations, a method for securing a trolley within a galley bay of a galley monument may include rolling a trolley into a trolley bay. For example, an operator may roll trolley 210 (illustrated in FIG. 1A) into trolley bay 2502 for storage.

In some implementations, brake(s) may be applied to one or more casters to retain the trolley's position within the trolley bay. For example, as discussed in relation to FIGS. 1A-1C, the trolley may have a brake pedal 2520 and a brake release pedal 2521 to apply and release brakes. In some implementations, pressing the brake pedal 2520 in a downward direction applies the brakes while pressing the brake release pedal 2521 in a downward direction releases the brakes. In some implementations, lifting the brake pedal 2520 in an upward direction applies the brakes while lifting the brake release pedal 2521 in an upward direction releases the brakes. In some implementations, pressing the brake pedal 2520 in a downward direction applies the brakes while pressing the brake pedal 2520 again further in a downward direction releases the brakes, negating the need for the brake release pedal 2521. In some implementations, the trolley may be secured in the trolley bay using a retention device. For example, as discussed in relation to FIG. 3A, the trolley 210 may be secured in the trolley bay with turn button assembly 1700. Actuation of the turn button assembly 1700, for example, may secure the trolley 210 and prevent fore/aft motion of the trolley 210, preferably such that the vertical location of a turn button 1702 is close to the height of the center of gravity of the trolley 210.

In some implementations, a trolley bay door may be closed and latched. For example, the operator may close trolley bay door 1400 illustrated in FIGS. 5A-5E, if the trolley bay is so equipped. The trolley bay door may include a closure prevention system 2500 discussed further below to latch the bay door 1400 and prevent the bay door 1400 from swinging open in the event of turbulence or during rapid changes in elevation such as landing or take-off. In some examples, the closure prevention system 2500 may provide door retention with a dual paddle latch, which may incorporate two independent latch pawls, such as the latch pawls 2516 that engage two independent pawl striker/retainers mounted to a front surface of the galley compartment 2502 to provide primary and secondary retention for the bay door 1400.

In other embodiments, the trolley bay may not include a trolley bay door, such that the operation closing and latching the trolley bay door would not be performed. Additionally, in some embodiments, the method may be performed in a different order of operations. For example, in some embodiments, the retention device, as explained in reference to FIGS. 5A-5E, may be on the outside of the trolley bay door. As such, securing the trolley in the trolley bay, in other implementations, may occur after closing the trolley bay door.

Additionally, the method, in some implementations, may be reversed to remove the trolley from the trolley bay. The complementary method of releasing the trolley, for example, may include actuating the retention device (e.g., turn button assembly 1700 in FIG. 3A) to release the trolley. For example, as discussed in relation to FIGS. 3A-3B, the trolley 210 may be released from the trolley bay 2502 by positioning the turn button 1702 such that the turn button 1702 is not in contact with the trolley 210. The turn button assembly 1700 may be mounted such that the turn button assembly 1700 is flush with the galley monument and out of the way when in a position to release or receive a trolley 210.

Further, upon disengaging the retention device, the brake may be released from the caster(s), and the trolley may be removed from the galley trolley bay. In some embodiments, there may be no need to cause the pedals to release from the stowed position. For example, upon moving the trolley into an aisle region upon moving the pedals away from the pedal lifter, the pedals may automatically move into operable position (e.g., due to gravity).

FIGS. 4A-4B illustrate front and rear views of galley turn buttons 1290 and 1294 having different lengths are depicted, according to an example embodiment for releasably retaining a trolley, such as the trolley 210 discussed above, within a trolley bay compartment of a galley monument. In some examples, as shown in FIG. 4B, the galley turn button 1290, as well as galley turn button 1294, may include a securing bolt 1292 mounted at one end of the galley turn button 1290. The securing bolt 1292 may be rotatably coupled to and pivot about an edge of a surface, such as that of a side panel 1104a,b or work deck panel 1108 of a galley monument. In some examples, the turn button 1290, 1294 may also include a rotating disk assembly 1293 surrounding the securing bolt 1292 with two detent positions that holds the turn button 1290 in a release position. If the stowed detent retention fails, the rotating disk assembly 1293 may assume a deployed or secured position to eliminate a risk of a trolley 210 being unrestrained if the turn button 1290 fails.

In some implementations, the galley turn buttons 1290, 1294 may serve as a load bearing body and a cover may be fitted over the galley turn buttons 1290, 1294 for aesthetic and ergonomic purposes, and may be secured to the turn buttons 1290, 1294 by a fastener such as a threaded screw. The shape of the cover may provide ease of operation for a user and replacement in the event of damage or if color fades or otherwise changes. In one example, the galley turn buttons 1290, 1294 may be rotated vertically and extend downward in a first position to hold a trolley 210 in place within a galley trolley bay 2502, and may be set in a second, horizontal position to allow the trolley 210 to freely roll into or out of the galley trolley bay 2502. In one example, the galley turn buttons 1290, 1294 may include a steel alloy and the cover may include an anodized aluminum alloy. The galley turn buttons 1290, 1294 and therefore the cover may be formed with at least as long a length as needed to secure the trolley 210 within the trolley bay 2502. In some implementations, the turn button 1294 may have a longer length than the turn button 1290 in order to secure an outer door of the trolley 210 in a closed position in order to prevent the contents of the trolley 210 from being ejected from the trolley 210 during a crash event. However, rotating the longer turn button 1294 to the release position while the shorter turn button 1290 is in the secured position may allow access to the contents of the trolley 210 while still retaining the trolley 210 within the trolley bay 2502 by the shorter turn button 1290.

FIGS. 5A-5E represent various views of a closure prevention system 2500 for a trolley bay, such as the trolley bay 2502. For example, FIGS. 5A and 5B show an inner surface of a portion of a bay door 1400. In some implementations, the closure prevention system 2500 as shown in FIG. 5C may include a bay door 1400 hingedly connected to a front side edge 1106a or 1106b (FIG. 3A) of the trolley bay 2502. In some examples, the trolley bay 2502 may include at least one of a door latch bar 2504 and turn buttons 1802, 1802b of a turn button assembly 1800 disposed on a front, upper edge of the trolley bay 2502, such as on a front surface of work deck panel 1108. In some examples, the door latch bar 2504 that functions as a retainer for door latch pawl 2516 may be disposed on the same edge as and adjacent to the turn buttons 1802, 1802b or on a different edge from the turn buttons 1802, 1802b. While the turn buttons 1802, 1802b are positioned on the front, horizontally-oriented, upper edge of the trolley bay 2502, it can be understood that the turn buttons 1802, 1802b may be positioned at any edge surrounding the periphery of an opening to the trolley bay 2502. For example, when the turn buttons 1802, 1802b are positioned on the front, horizontally-oriented, upper edge of the trolley bay 2502, the first position of the turn buttons 1802, 1802b for inserting or releasing the trolley 210 from the trolley bay 2502 may correspond to a substantially horizontal orientation of the turn buttons 1802, 1802b, and the second position for securing the trolley 210 within the trolley bay 2502 may correspond to a substantially vertical orientation of the turn buttons 1802, 1802b. Similarly, when the turn buttons 1802, 1802b are disposed on a front, vertically-oriented side edge of the trolley bay 2502, the first position of the turn buttons 1802, 1802b for inserting or releasing the trolley 210 from the trolley bay 2502 may correspond to a substantially vertical orientation of the turn buttons 1802, 1802b, and the second position for securing the trolley 210 within the trolley bay 2502 may correspond to a substantially horizontal orientation of the turn buttons 1802, 1802b.

In some implementations, the bay door 1400 may include a door stop 2510 for each turn button 1802 and/or 1802b, a turn button recess 2512, a latch recess 2514, and a door latch pawl 2516, which may be positioned on an inner surface of the bay door 1400 to enclose at least a portion of the turn button 1802 and the door latch bar 2504, respectively, in a case where the bay door 1400 is fully closed against the trolley bay 1706. For example, the turn button recess 2512 may be positioned at a location on the inner surface of the bay door 1400 that corresponds to a position of the turn buttons 1802, 1802b, and the latch recess 2514 may be positioned at a location on the inner surface of the bay door 1400 that corresponds to a position of the door latch bar 2504. For example, FIG. 5D illustrates exemplary positions of the door latch bar 2504 and turn buttons 1802, 1802b on a front, upper edge of the trolley bay 2502.

In addition, the dimensions of the turn button recess 2512 and latch recess 2514 may be based on dimensions of the turn buttons 1802, 1802b in the secured position (e.g., second position for securing the trolley within the trolley bay) and door latch bar 2504, respectively, such that the turn buttons 1802, 1802b fit within the turn button recess 2512 and the door latch bar 2504 fits within the door latch recess 2514 when the bay door 1400 is closed. For example, FIG. 5E illustrates a perspective view of a portion of an interior of a galley bay 2502 in which the turn buttons 1802, 1802b are in the secured (e.g., second) position and fit within the turn button recess 2512, thereby allowing the bay door 1400 to fully close. In some implementations, a depth of the turn button recess 2512 and door latch recess 2514 may be similarly based on a thickness of the turn buttons 1802, 1802b and door latch bar 2504, respectively, to allow the turn button recess 2512 and the latch recess to receive the respective turn buttons 1802, 1802b and door latch bar 2504. In some examples, the door latch pawl 2516 may be positioned within the latch recess 2514 and may be configured to engage the door latch bar 2504 when the bay door 1400 is moved to the closed position.

In some implementations, if an attempt is made to close the bay door 1400 and the turn button 1802 and/or 1802b is in a first position to allow a trolley 2518 to be inserted or removed from the trolley bay 1706 (e.g., the turn button 1802 is rotated substantially horizontally), the bay door 1400 cannot be secured nor fully closed due to interference that occurs between the door stop 2510 and turn button 1802 when the door stop 2510 impacts (e.g., makes contact with) the turn button 1802 as the bay door 1400 is rotated from the open position to the closed position. In addition, the impact between the door stop 2510 and the turn button 1802 and/or 1802b may prevent the door latch pawl 2516 from fully connecting with the door latch bar 2504 as the bay door 1400 is closed. For example, the door stops 2510 may make contact with a respective turn button 1802, 1802b when the turn buttons 1802, 1802b are not retaining the carts in order to prevent forcing the door 1400 to latch shut without first securing the trolley with the turn buttons 1802, 1802b.

If an attempt is made to close the bay door 1400 and the turn button 1802 is in a second position to prevent the trolley 2518 from being inserted or removed from the trolley bay 2502 (e.g., the turn button 1802 is rotated vertically), the bay door 1400 may be secured to the trolley bay 1706 and fully closed as the door stop 2510 has sufficient clearance so as not to impact the turn button 1802, thereby allowing the door latch pawl 2516 to fully engage with the door latch bar 2504. When the bay door 1400 is in a fully closed position, the door latch bar 2504 may be retained within the latch recess 2514 and the door latch bar 2504 may engage the door latch pawl 2516 disposed within the latch recess 2516. In some examples, the door latch pawl 2516 may secure the bay door 1400 to the trolley bay 1706 and provides an amount of resistance against opening of the bay door 1400 so that the bay door 1400 does not inadvertently swing from the closed position to the open position in response to forces from turbulence or other types of unexpected motion within the aircraft.

In some examples, the trolley bay 2502 may include more than one turn button 1802 disposed at more than one location around a periphery of a front opening to the trolley bay 2502. The bay door 1400 may similarly include more than one door stop 2510, turn button recess 2512, latch recess 2514, and door latch pawl 2516 disposed on an inner surface at complementary locations that correspond to locations of the turn buttons 1802, 1802b and/or door latch bar 2504. In some implementations, the combination of the turn button assembly 1700, door latch bar 2504, turn button recess 2512, and latch recess 2514 help to ensure that the trolley 210 remains secure within the trolley bay 2502 and does not inadvertently slide into our out of the trolley bay 2502 due to unexpected movements of the aircraft. In some examples, the trolley bay 2502 may include two latch bars 2504 and corresponding latch recesses 2514 with door latch pawls 2516 that each engage a respective latch bar 2504 to provide primary and secondary retention for the bay door 1400.

Figure 5F:
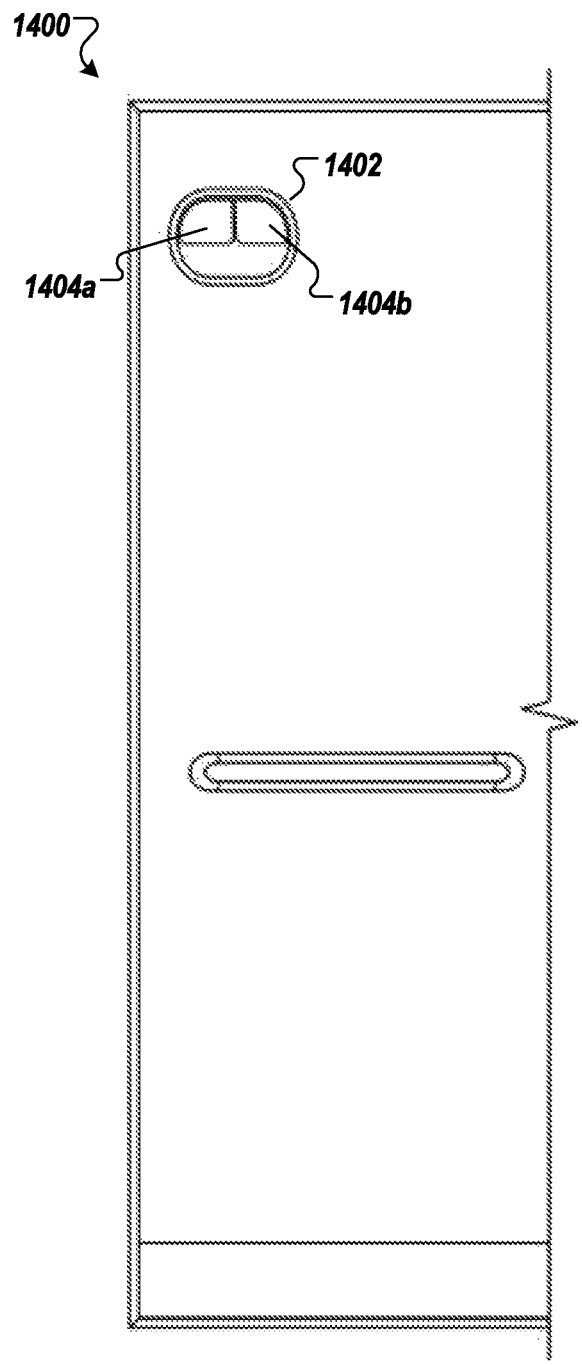
FIG. 5F illustrates an outer surface of a bay door for a galley trolley bay.

FIG. 5F illustrates an outer surface of the bay door 1400 including a dual paddle latch assembly 1402. In some implementations, the dual paddle latch assembly 1402 may include latches 1404a, 1404b associated with separate latch pawls 2516 that may be configured to engage and/or disengage a respective latch pawl 2516 from a respective door latch 2504. For example, the latches 1404a, 1404b may be individually operated from outside the door 1400 by pulling outward on the latches 1404a, 1404b to disengage a respective latch pawl 2516 from a door latch 2504 to open the door 2504. Similarly, the latches 1404a, 1404b may be pushed inward to engage a respective latch pawl 2516 in order to provide independent primary and secondary latching for the door 1400. In some examples, the latches 1404a, 1404b may be operated simultaneously.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A retaining assembly for securing a trolley within an aircraft galley compartment, the retaining assembly comprising:
    a turn button assembly including at least one turn button rotatably connected to a front edge of the aircraft galley compartment, the at least one turn button configured to secure the trolley within the aircraft galley compartment, wherein the at least one turn button of the turn button assembly is disposed on a front, vertically-oriented side edge of the aircraft galley compartment, wherein
        the at least one turn button is configured to rotate between a first position for allowing insertion or release of the trolley from the aircraft galley compartment and a second position for securing the trolley within the aircraft galley compartment,
        the at least one turn button positioned at or below a vertical position of a center of gravity (COG) of the trolley to prevent fore and/or aft movement and rotation of the trolley while experiencing flight or crash loads;
    a turn button recess disposed on an inner surface of a panel door hingedly coupled to an edge of an opening for the aircraft galley compartment at a position that is complementary to a position of the at least one turn button on the front edge of the aircraft galley compartment, wherein
        the turn button recess is configured to receive the at least one turn button of the turn button assembly within the turn button recess when the at least one turn button is in the second position, thereby allowing the panel door to fully close over the opening for the aircraft galley compartment;
    a door latch bar mounted to a front edge of the aircraft galley compartment, the door latch bar configured to secure the panel door to the front edge of the aircraft galley compartment; and
    at least one door stop disposed on the inner surface of the panel door adjacent to the turn button recess at a position on the inner surface of the panel door that is complementary to the first position of the at least one turn button on the front edge of the aircraft galley compartment, each of the at least one door stop extending outwardly away from the inner surface of the panel door.

2. The retaining assembly of claim 1, wherein the at least one turn button comprises two turn buttons, wherein the at least one door stop comprises two door stops, wherein each of the at least one door stop is configured to contact a respective turn button of the turn button assembly when the respective turn button is in the first position, thereby preventing the panel door from fully closing over the opening for the aircraft galley compartment.

3. The retaining assembly of claim 1, further comprising a door latch recess disposed on the inner surface of the panel door at a position that is complementary to a position of the door latch bar on the front edge of the aircraft galley compartment.

4. The retaining assembly of claim 3, wherein the door latch bar is configured to fit within the door latch recess when the panel door is in a fully closed position over the opening to the aircraft galley compartment.

5. The retaining assembly of claim 4, wherein the door latch recess includes a door latch pawl configured to engage the door latch bar received within the door latch recess when the panel door is in the fully closed position, wherein the door latch pawl is positioned on the inner surface of the panel door to enclose at least a portion of the at least one turn button and the door latch bar, respectively, if the panel door is fully closed against the aircraft galley compartment.

6. The retaining assembly of claim 5, wherein engagement of the door latch bar with the door latch pawl is configured to provide an amount of resistance against opening of the panel door to prevent inadvertent opening of the panel door due to unexpected forces experienced by the aircraft galley compartment.

7. The retaining assembly of claim 5, further comprising an additional turn button assembly including at least one additional turn button, wherein the at least one additional turn button of the additional turn button assembly is disposed on a front, horizontally-oriented upper edge of the aircraft galley compartment, wherein the at least one additional turn button comprises two additional turn buttons, wherein each of the two additional turn buttons has a different length from another of the two additional turn buttons.

8. The retaining assembly of claim 7, wherein a first position of each of the at least one additional turn button for allowing insertion or release of the trolley from the aircraft galley compartment corresponds to a substantially horizontal orientation of the at least one additional turn button.

9. The retaining assembly of claim 7, wherein a second position of each of the at least one additional turn button for securing the trolley within the aircraft galley compartment corresponds to a substantially vertical orientation of the at least one additional turn button.

10. The retaining assembly of claim 7, wherein the at least one turn button comprises two turn buttons, wherein the at least one door stop comprises two door stops, wherein each of the at least one door stop is configured to contact a respective turn button of the turn button assembly when the respective turn button is in the first position, thereby preventing the panel door from fully closing over the opening for the aircraft galley compartment.

11. The retaining assembly of claim 1, wherein the door latch bar is mounted to the front edge of the aircraft galley compartment adjacent to the at least one turn button of the turn button assembly.

12. The retaining assembly of claim 1, wherein the at least one turn button, when in the second position for securing the trolley within the aircraft galley compartment, is configured to abut at least a portion of a front surface of the trolley.

13. The retaining assembly of claim 1, wherein the at least one turn button is positioned on the front, vertically-oriented side edge of the aircraft galley compartment at or below a vertical position of a center of gravity of the trolley secured within the aircraft galley compartment to prevent fore and/or aft movement and rotation of the trolley within the aircraft galley compartment.

14. The retaining assembly of claim 1, wherein the first position of the at least one turn button for allowing insertion or release of the trolley from the aircraft galley compartment corresponds to a substantially vertical orientation of the at least one turn button.

15. The retaining assembly of claim 1, wherein a second position of the at least one turn button for securing the trolley within the aircraft galley compartment corresponds to a substantially horizontal orientation of the at least one turn button.

16. An aircraft galley compartment disposed within an aircraft galley monument, the aircraft galley compartment comprising:
  an enclosure configured to house a trolley, the enclosure comprising a rear surface, an upper wall, and opposing side walls, wherein a front side of the trolley upon stowing is disposed proximate an opening at a front surface of the enclosure, the front surface opposite the rear surface;
  a panel door hingedly coupled to an edge of the opening at the front surface of the enclosure, wherein the panel door, in a closed position, is configured to cover the opening at the front surface of the enclosure; and
  a retaining assembly for securing a lateral position of the trolley within the enclosure of the aircraft galley compartment, the retaining assembly including
    a turn button assembly including at least one turn button rotatably connected to a front edge of the enclosure, the at least one turn button configured to secure the lateral position of the trolley within the enclosure, wherein the at least one turn button of the turn button assembly is disposed on a front, vertically-oriented side edge of the aircraft galley compartment, wherein
      the at least one turn button is configured to rotate between a first position for allowing insertion or release of the trolley from the enclosure and a second position for securing the lateral position of the trolley within the enclosure,
      the at least one turn button positioned at or below a vertical position of a center of gravity (COG) of the trolley to prevent fore and/or aft movement and rotation of the trolley while experiencing flight or crash loads,
    a turn button recess disposed on an inner surface of the panel door at a position that is complementary to a position of the at least one turn button on the front edge of the enclosure, wherein
      the turn button recess is configured to receive the at least one turn button of the turn button assembly within the turn button recess when the at least one turn button is in the second position, thereby allowing the panel door to fully close over the opening for the enclosure,
    a door latch bar mounted to a front edge of the aircraft galley compartment, the door latch bar configured to secure the panel door to the front edge of the aircraft galley compartment, and
    at least one door stop disposed on the inner surface of the panel door adjacent to the turn button recess at a position on the inner surface of the panel door that is complementary to the first position of the at least one turn button on the front edge of the aircraft galley compartment, each of the at least one door stop extending outwardly away from the inner surface of the panel door.

17. The aircraft galley compartment of claim 16, wherein the at least one turn button comprises two turn buttons, wherein the at least one door stop comprises two door stops, wherein each of the at least one door stop is configured to contact a respective turn button of the turn button assembly when the respective turn button is in the first position, thereby preventing the panel door from fully closing over the opening for the enclosure.

* * * * *